E. E. KEETON.
ANTISKIDDING DEVICE FOR WHEEL TIRES.
APPLICATION FILED MAR. 29, 1916.
1,280,489.
Patented Oct. 1, 1918.
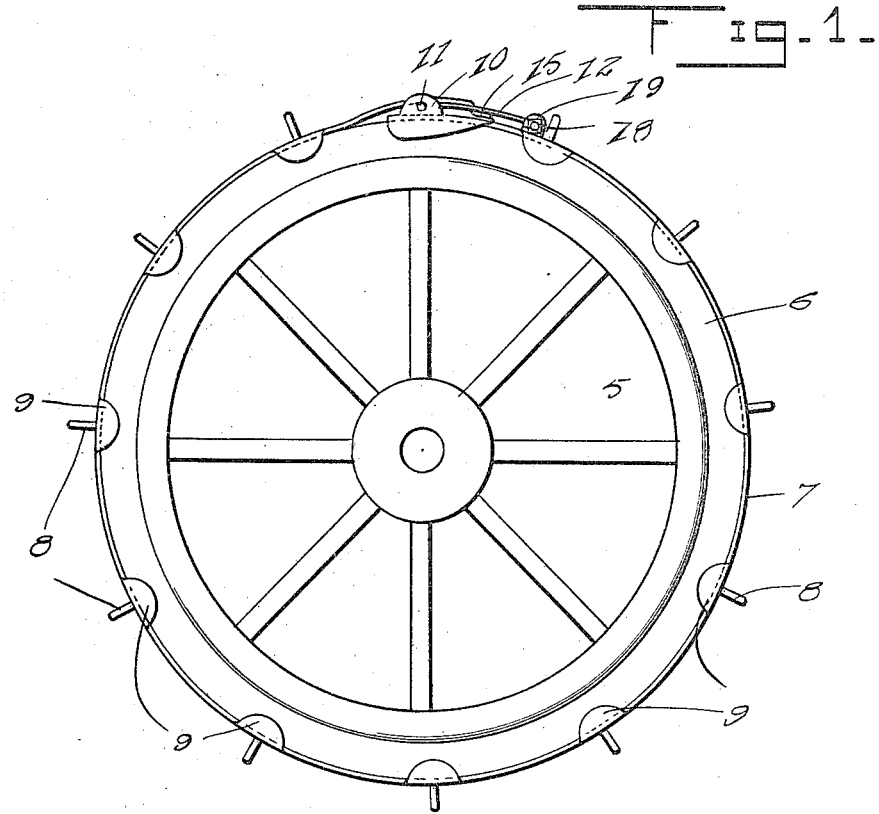
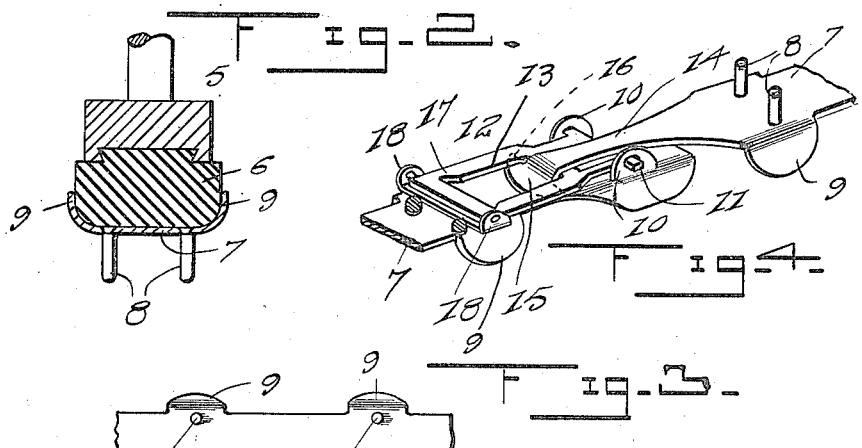
Witness
*[signatures]*
Inventor
E. E. Keeton.
By *[signature]*
Attorney ably the same spring or resiliency as the inherent
UNITED STATES PATENT OFFICE.

ERNEST E. KEETON, OF LYTLE, COLORADO.

ANTISKIDDING DEVICE FOR WHEEL-TIRES.

1,280,489.  Specification of Letters Patent.  Patented Oct. 1, 1918.

Application filed March 29, 1916. Serial No. 87,506.

*To all whom it may concern:*

Be it known that I, ERNEST E. KEETON, a citizen of the United States, residing at Lytle, in the county of El Paso and State of Colorado, have invented certain new and useful Improvements in Antiskidding Devices for Wheel-Tires; and I do hereby declare the following to be a full, clear, and exact description of the invention, such as will enable others skilled in the art to which it appertains to make and use the same.

This invention has for its object to provide a conveniently attachable device for effectively preventing lateral and circumferential slipping or skidding of a vehicle wheel tire.

Another object is the provision of an antiskidding device embodying a spring band adapted to embrace the tread portion of a vehicle tire and conveniently releasable means for fastening the band in position upon the tire.

With these and other objects in view, the invention consists in the novel construction, combination and arrangement of parts as will be hereinafter specifically described, claimed and illustrated in the accompanying drawing, in which:

Figure 1 represents a side elevation of a vehicle wheel, illustrating the anti-skidding device applied thereto, Fig. 2 represents a transverse sectional view through the rim of the vehicle wheel and anti-skidding device, Fig. 3 represents a fragmental plan view of the anti-skidding device removed, and Fig. 4 represents a fragmental perspective view, illustrating the fastener connecting the ends of the band in detail.

Referring to the drawing in detail, wherein similar reference numerals indicate corresponding parts throughout the several views, the numeral 5 indicates generally a vehicle wheel of the usual construction upon which is supported a cushion tire 6.

The improved anti-skidding device includes essentially a curved strip or band 7 of approximately the same width as the tread portion of the tire 6 and constructed of such material as to have approximately the same spring or resiliency as the inherent resiliency of the rubber or other material from which the tire 6 is constructed. A plurality of anti-skidding lugs 8 are arranged in pairs circumferentially about the band 7 and, when the latter is applied to the wheel tire, projects radially therefrom. As clearly illustrated in Figs. 2 and 3, the lugs of each pair are alined transversely of the band 7 and the latter, at points adjacent the pairs of lugs, is formed upon both longitudinal edges with laterally projecting and angular ears or clips 9, designed to embrace the sides of the tire 6 and prevent the band from slipping laterally thereon.

A pair of apertured ears 10 are struck out adjacent one end of the band 7 and pivotally receive a pair of oppositely directed pins 11 carried by a fastening member designated generally by the numeral 12. The central portion of the fastening member 12 is formed with a longitudinal slot 13, receiving the opposite reduced end 14 of the band, which latter is offset adjacent its free end and formed with a head 15 defining a pair of shoulders 16, which engage the fastening members 12 and prevent the head from being withdrawn through the slot. The end of the slot 13 adjacent the free end of the fastening member 12 is enlarged, as indicated at 17, to facilitate removal of the head therethrough when it is desired to disconnect the ends of the band 7. A pair of spaced apertured ears 18 are secured to the end of the band 7 carrying the clamping member 12 and are adapted to receive the free end of the latter when swung to the position illustrated in Fig. 4. To lock the fastening member in locked position, a bolt 19, Fig. 1, is positioned through the apertures in the ears 18 and is engaged with the free end of the fastening member.

What is claimed is:—

1. In combination, a band having the ends thereof overlapped and one of the same reduced in width, said reduced end having an enlarged offset head, said head lying in a plane below the reduced end and parallel therewith, a fastening member pivotally secured to the opposite end of said band and having a longitudinal slot receiving the headed reduced end, one end of said slot being enlarged to facilitate the removal of the head therethrough, and means engaging the free end of the fastening member to hold the same in locked position.

2. In combination, a band having a reduced end provided with an offset terminal, a head carried by said offset terminal, a fastening member pivotally secured to the opposite end of said band and having a longitudinal slot receiving the headed reduced end, one end of said slot being enlarged to facilitate the removal of the head therethrough, a pair of upstanding ears carried by one end of the band in rear of the point of connection of the fastening element thereto to receive the free end of the fastening element to prevent lateral movement thereof, and means carried by the ears to engage the free end of the fastening element to hold the same in locked position.

In testimony whereof I affix my signature in presence of two witnesses.

ERNEST E. KEETON.

Witnesses:
WILLIS L. STRACHAN,
EDWIN J. EATON.

Copies of this patent may be obtained for five cents each, by addressing the "Commissioner of Patents, Washington, D. C."